US 8,958,783 B2

(12) United States Patent
Soundrapandian et al.

(10) Patent No.: US 8,958,783 B2
(45) Date of Patent: Feb. 17, 2015

(54) SYSTEM AND METHOD FOR SHORT-RANGE ELECTRONIC COMMUNICATION

(75) Inventors: Suriyaprakash Soundrapandian, Chandler, AZ (US); James Dean Midtun, Chandler, AZ (US)

(73) Assignee: Mitel Networks Corporation, Ottawa, Ontario (CA)

( * ) Notice: Subject to any disclaimer, the term of this patent is extended or adjusted under 35 U.S.C. 154(b) by 0 days.

(21) Appl. No.: 13/136,253

(22) Filed: Jul. 26, 2011

(65) Prior Publication Data

US 2013/0029648 A1 Jan. 31, 2013

(51) Int. Cl.
*H04W 4/02* (2009.01)
*H04M 1/725* (2006.01)

(52) U.S. Cl.
CPC ........ *H04M 1/7253* (2013.01); *H04M 2250/02* (2013.01); *H04M 2250/04* (2013.01)
USPC ........ 455/416; 455/410; 455/414.1; 455/411; 455/452; 455/519; 379/204.01; 379/202.01; 379/201.01; 379/203.01

(58) Field of Classification Search
USPC ............... 455/41.1–41.3, 66.1, 557, 550.1, 455/517–519, 552.1, 416–419, 410, 414.1, 455/452; 379/201.01, 202.01, 203.01, 379/204.01
See application file for complete search history.

(56) References Cited

U.S. PATENT DOCUMENTS

| 7,158,757 | B2 * | 1/2007 | Buttet ........................ 455/41.3 |
| 7,885,684 | B2 * | 2/2011 | Mauney et al. ............ 455/552.1 |
| 8,014,720 | B2 * | 9/2011 | Lortz ........................... 455/41.1 |
| 8,014,721 | B2 * | 9/2011 | Johnson ...................... 455/41.1 |
| 2006/0040692 | A1 * | 2/2006 | Anttila et al. ................. 455/519 |
| 2006/0149815 | A1 * | 7/2006 | Spradling et al. ............ 709/205 |
| 2008/0072334 | A1 * | 3/2008 | Bailey et al. .................. 726/28 |
| 2008/0090520 | A1 * | 4/2008 | Camp et al. ................. 455/41.2 |
| 2012/0131653 | A1 * | 5/2012 | Pasquero et al. ................. 726/6 |

FOREIGN PATENT DOCUMENTS

EP 2575291 A2 4/2013
WO WO 2012/015310 A1 2/2012

OTHER PUBLICATIONS

Alexandre Alapetite; "Dynamic 2D-barcodes for multi-device Web session migration including mobile phones", Personal and Ubiquitous Computing, Apr. 2, 2009; pp. 45-52; XP019783613.

\* cited by examiner

*Primary Examiner* — Michael T Vu (57) ABSTRACT

A system and method for transferring information over a short range are disclosed. The system and method can be used for a variety of applications, including administrative provisioning of information to particular users, providing information relating to a user during a conference call, handing off calls to or from another phone, for other application deployment, for pass of control, and similar applications. The system includes a first device capable of short-range communication and having a client application thereon and a second device capable of short-range communication and having a client or an administrator application thereon. Information is passed between the first device and the second device using short range communication.

8 Claims, 5 Drawing Sheets

SYSTEM AND METHOD FOR SHORT-RANGE ELECTRONIC COMMUNICATION

FIELD OF THE INVENTION

The present disclosure generally relates to electronic systems and methods. More particularly, the disclosure relates to systems and methods that use short-range electronic communication to transfer information in a secure manner.

BACKGROUND OF THE INVENTION

Connecting a mobile device, such as a mobile phone, personal computer, tablet, or the like, to a secure network generally requires several manual steps by a mobile device user to enable the mobile device user to securely connect to the network. For example, the mobile device user may be required to find a required mobile program, manually load the program onto a mobile device, and manually install the program. Once the mobile program is installed, the user is often further required to enter information, such as a server name, a user name, and a corresponding password before the user is allowed access to the network.

Although the amount of information required to be entered by the user for such communications can be relatively small, oftentimes, the user doesn't know or may have forgotten some of the information required to gain access to the network. As a result, additional user time to look up the information and/or administrator time to assist with the setup is required to allow the user to connect to the network. Additionally, entering the required information on a mobile device may be challenging because of the relatively small keyboards on such devices.

Accordingly, improved methods and systems for connecting mobile devices to a network are desired.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The short-range communication system and method of the present disclosure may be used for a variety of applications, such as administrative provisioning of information to particular users, providing information relating to a user during a conference call, handing off calls to or from another phone, for application deployment, to temporarily provide access to a secure network, and the like. As set forth in more detail below, the exemplary system and method are generally easier to use, less time consuming, and require less manual input from users, compared to traditional systems and methods that provide similar functions.

Figure 1:
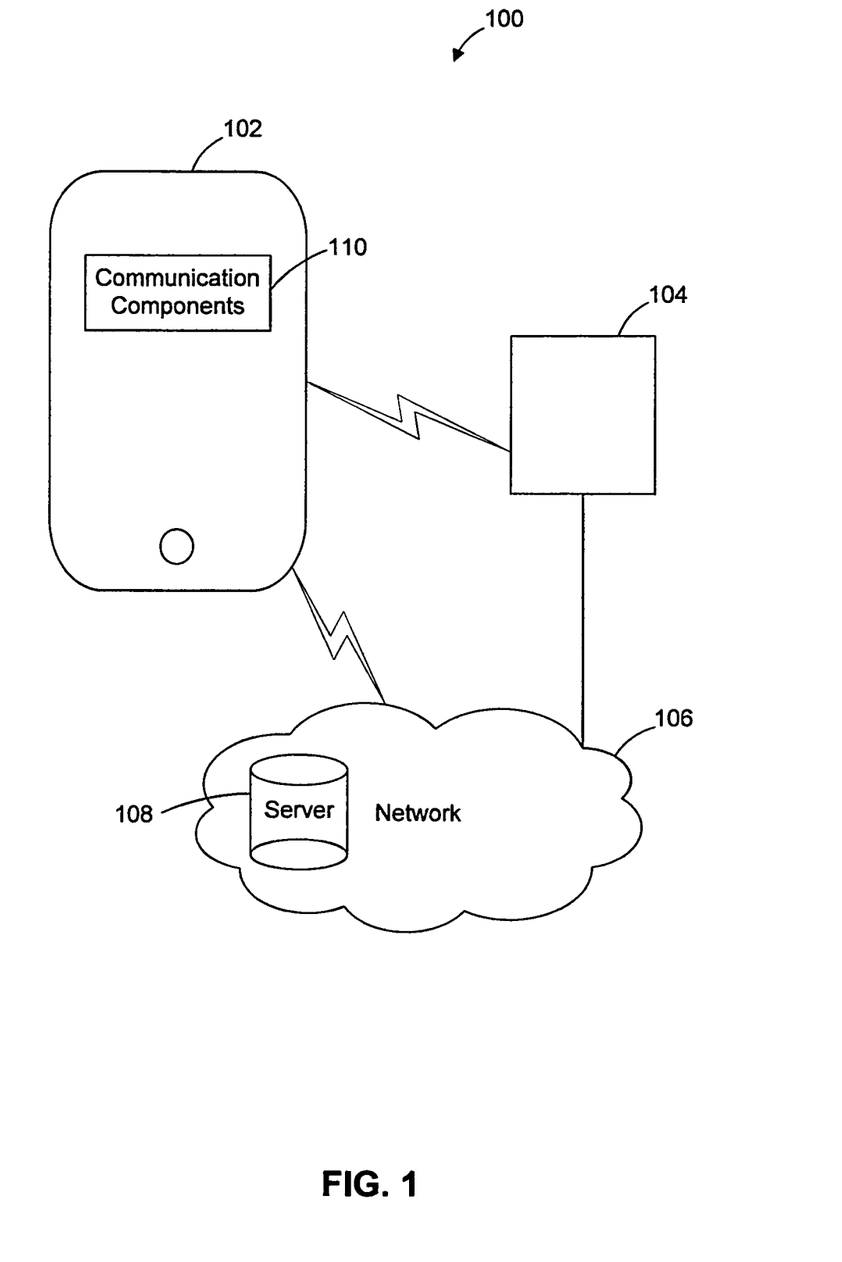
FIG. 1 illustrates a short-range communication system in accordance with various exemplary embodiments of the invention.

FIG. 1 illustrates an exemplary system 100 in accordance with various embodiments of the invention. System 100 may be used for a variety of applications, such as application deployment, as a proximity trigger for applications, and the like. System 100 includes a mobile device 102, a receiver/transmitter device 104, and a network 106. In the illustrated example, mobile device 102 includes communication components 110, which communicate with device 104 using a short-range communication protocol; device 104 may, in turn, communicate with network 106 using any suitable wired or wireless technology.

Mobile device 102 may be a smart phone, a tablet computer, a personal computer, or any other mobile device that includes communication components 110 (e.g., a short-range transmitter/receiver) for short-range wireless transmission of information between device 102 and device 104 and associated client application software. In the context of this disclosure, short-range means a distance of about two feet or less, about one foot or less, or about 4 cm or less.

Device 104 may include any device capable of short-range wireless communication with device 102. By way of examples, device 104 may include a desk phone, a conference unit, a stand-alone device, another mobile device, or the like having short-range wireless communication hardware. Device 104 may also suitably include administrator client software, as described in more detail below.

Suitable short-range devices protocols for communication between device 102 and device 104 include Near Field Communication (NFC), Bluetooth, Infrared technology, and the like. However, NFC devices and protocols may be particularly desirable because of their relatively short communication distance (about 4 cm or less) and because of their relative ease of use. The short communication range adds security to the information transmission, because information can only be transferred between device 102 and device 104 when the devices are close enough (e.g., less than about 4 cm) to receive a transmission from the other device.

Network 106 may include a local area network (LAN), a wide area network, a personal area network, a campus area network, a metropolitan area network, a global area network, or the like. Network 106 may be coupled to device 104 using an Ethernet connection, other wired connections, a WiFi interface, other wireless interfaces, or the like. Network 106 may be coupled to other networks and/or to other devices typically coupled to networks.

The system and method of the present invention may be used for a variety of applications, some of which are illustrated below. The examples provided below are for illustration only and are not meant to limit the scope of the invention.

Data Provisioning

In accordance with exemplary embodiments of the disclosure, System 100 provides a relatively easy way for mobile device users to be provisioned with a server 108 details and credentials, such as the server name and any requisite user name and/or password. Thus, a user is not required to manually enter such information.

Use of system 100 may have several advantages over use of traditional systems, which require manual input of information to access a server/network. For example, system 100 does not require credentials, such as a username and password, to be communicated through other means, such as email or instant messaging. In addition, because system 100 uses short-range communication, system 100 is relatively secure and is less susceptible to attacks, such as "middle-man attacks." Moreover, less work is required to set up system 100 and transfer information to various users.

Figure 2:
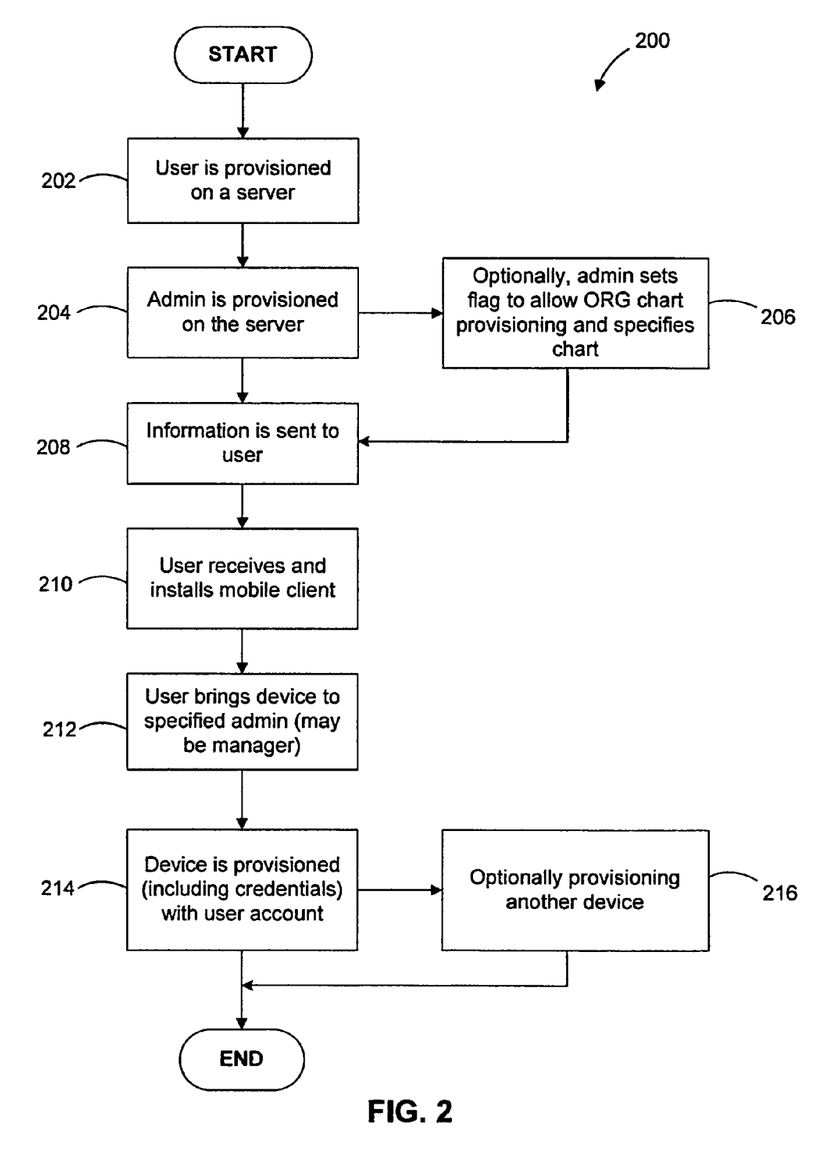
FIG. 2 illustrates a method of provisioning information in accordance with additional exemplary embodiments of the invention.

FIG. 2 illustrates an exemplary method for provisioning data using a system, such as the system illustrated in FIG. 1. Method 200 includes the steps of provisioning user information on a server (step 202), provisioning administrator information on the server (step 204), optionally an administrator setting a flag to allow organizational chart provisioning (step 206), sending information from the server to a mobile device (step 208), installing mobile client software (step 210), placing a mobile device proximate a specified receiver/transmitter device (step 212), provisioning the mobile device with information using short-range communication devices and protocols (step 214), and optionally provisioning another device (step 216).

During step 202, user information is stored on a server 108—e.g., a server that is part of or is connected to network 106. User information may include, for example, user account information, such as name, user name, password, position in an organization, server name, and the like. This information may be entered by an administrator of the server or network.

During step 204, administrator information is stored on the server. The administrator information may include, for example, user account information, such as administrator credentials, name, user name, password, position in an organization, server name, and the like.

During optional step 206, an administrator can set a flag to enable organizational hierarchy provisioning, which allows an administrator to specify a method of reference, such as a URL, a document or other reference, to an organizational or similar chart. The organizational chart (e.g., located on server 108) may specify, for example, managers and subordinates. When enabled, managers are authorized to provision subordinates' mobile clients and optionally to provision other managers' mobile clients. In this case, method 200 distributes the administrator responsibilities across multiple managers, thereby reducing an amount of work required by any single administrator or site. Alternatively, an organization may have a single administrator or site for authorizations.

Information is sent to the mobile user in step 210. The information may be sent from, for example, server 108, which may include a Unified Communications and Collaboration (UCC) server, and may be sent in the form of a text message, an email, or similar communication. The information may include user client software to enable desired access of device 102 to network 106. Once the information is received, the user may be prompted as to whether the client would like to install the software. If the client elects to install the software, the client is instructed how to install the client software.

Following the installation of the software, the client is instructed (e.g., via a message displayed on a mobile device) to visit a particular administrator or one of a plurality of administrators that can be used to verify the client. There may be a single administrator designated for all users, or multiple administrators may be designated for various combinations of users.

Figure 3:
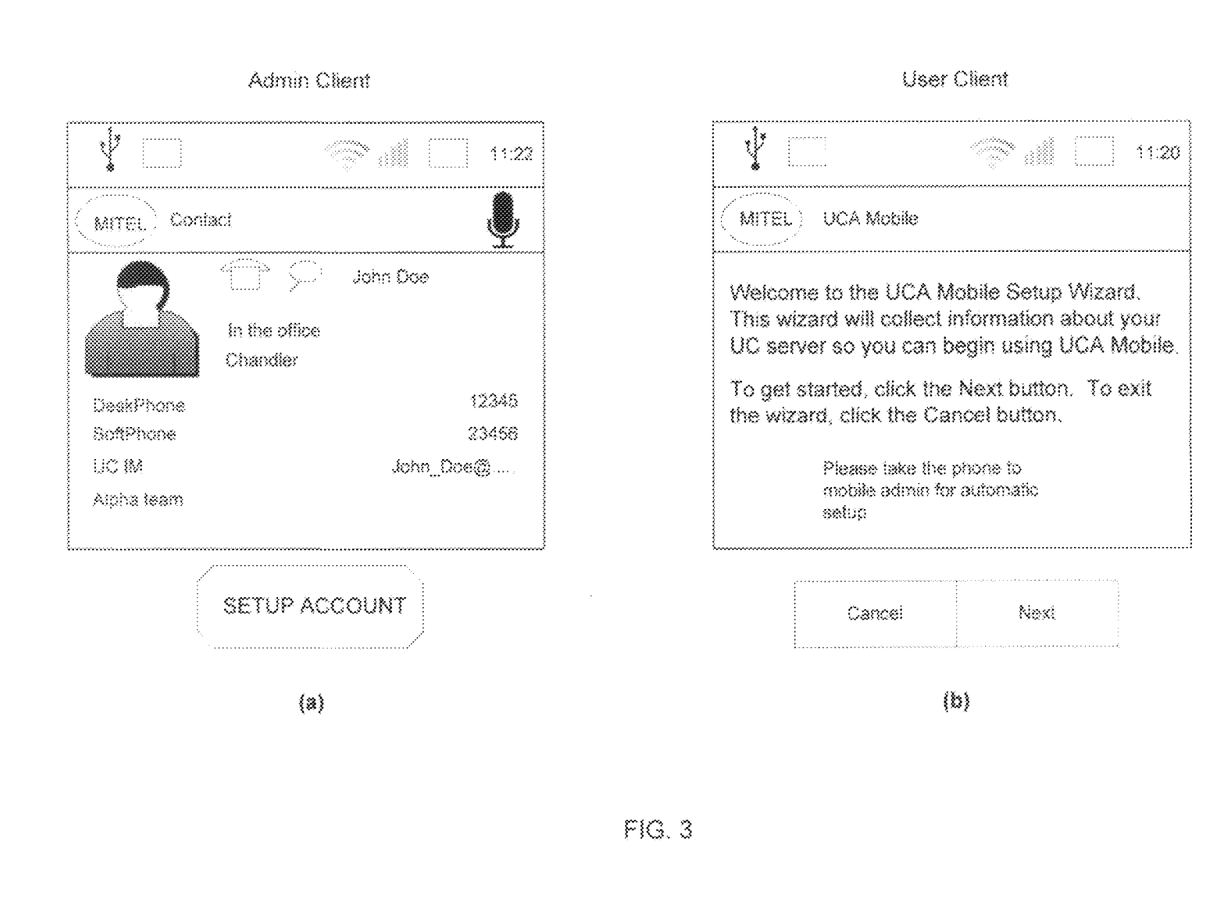
FIG. 3 illustrates a portion of an exemplary client application in accordance with exemplary embodiments of the invention.

FIG. 3(*b*) illustrates an exemplary screen shot of a mobile device 102 that includes information sent to device 102 (user client) during step 210. As illustrated, once the user client information is transferred to device 102 and the user client program is installed, the user is instructed to take device 102 to an administrator for continued setup of device 102.

Once the user brings device 102 near an administrator or manager, the administrator or manager opens contact information for the particular user. The administrator is requested to verify the user (e.g., by comparing an image of the user to the user in the presence of the administrator) and, if the user is verified, to allow or approve setup of the user's account by the transfer of information from network 106 to device 102. FIG. 3(*a*) illustrates a screen image suitable for use by the administrator to verify a client/user and to setup the user's account.

Once administrator has authorized the account setup, the user then brings device 102 proximate device 104, in this case an administrator device, for provisioning of user account information (step 212). Once device is within the range limit for the short-range communication (e.g., about 4 cm for NFC), the information is automatically propagated to user device 102. The information transmitted may depend on a level within an organization of the user. For example, the information may be different for users in different groups, such as legal, engineers, visitors, managers, and the like. Similarly, the information can pass authorization to a user—e.g., to be an administrator for one day.

By way of example, the provisioned information may include a message that is sent to a client application, and the client application receives the message and automatically configures the client device. The data passed between the administrator device (e.g., device 104) and the client device (e.g., device 102) may be signed and/or encrypted, such that only the designated client is able to decode the message. In the illustrated case, all information required to obtain desired access to network 106 is transferred to the user client via device 104, such that the user does not need to enter any username, password, or other information to access authorized portions of network 106. By way of example, when the administrator selects "setup account," as illustrated in FIG. 3(*a*), an NDEF (NFC Data Exchange Format) message containing the server name, user login, password or access key, and voicemail pin is automatically acquired by device 102, without further input by the user or the administrator.

Once a mobile device has been provisioned in accordance with step 214, during step 216, a user may provision additional devices and/or change a device that has access to network 106 using short-range communication as described herein. For example, client software may be loaded onto both the device provisioning the data and the device receiving the data (e.g., the same or similar client software transferred according to the same method as set forth in step 210). Such provisioning may need to be authorized during step 212. For example, when the two mobile devices are placed proximate each other (e.g., less than about 4 cm for NFC communication), the provisioning device application may ask for verification of the device being provisioned. If authorized, information may be transferred from one mobile device to another device in accordance with step 214 of method 200.

In accordance with some embodiments of the invention, all users will be authorized to provision other devices associated with or owned by the respective users. For example, a user may specify information associated with a particular account (e.g., contacts information, username, password, server name for a particular location, and the like) to be provisioned from one device (e.g., a mobile phone) associated with the user to another device (e.g., another phone, computer, tablet, or the like) associated with the user. Allowing users to provision their own devices eliminates the requirement to know the server name, username, password and/or for an IT specialist or an administrator to be involved in transferring or copying the requisite information. Step 216 can also be used to allow users to sync their private data, such as Network, Location, and Bluetooth Connection, between devices, without using any unsecured transmission. Although illustrated as part of method 200, step 216 may be performed without the need of the other steps of method 200. In other words, step 216 may be a stand-alone process.

Conference Call Applications

Figure 4:
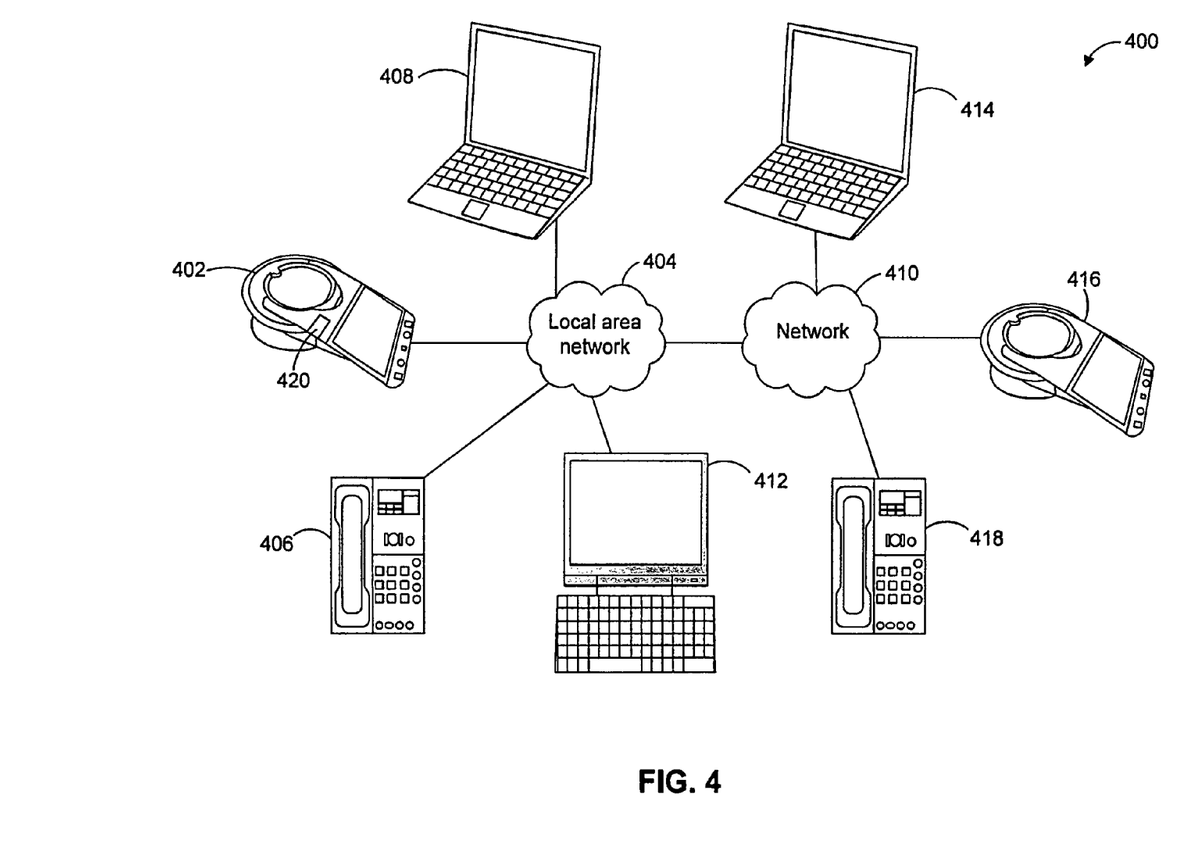
FIG. 4 illustrates another short-range communication system in accordance with exemplary embodiments of the invention.

FIG. 4 illustrates a system 400 in accordance with various embodiments of the invention. System 400 may be used for a variety of applications, including audio web conferencing (AWC). As illustrated, system 400 includes a collaboration appliance 402, which can be used to establish a teleconference with other devices directly or indirectly connected to appliance 402. Appliance 402 may be any appliance suitable for establishing the call, such as the collaboration appliance described in Ser. No. 13/068,170. As explained in greater detail below, system 400 can be used to monitor and track conference call participants, without manually entering any information, but rather by automatically transferring information about the participant(s) using short-range communication techniques as described herein. Such information can be used for, for example, ISO 9000.

In the illustrated embodiment, appliance 402 is coupled to a local area network (LAN) 404 using, e.g., an Ethernet connection, WiFi interface, or the like. However, appliance 402 can suitably be coupled to other types of networks, such as a wide area network, personal area network, campus area network, metropolitan area network, global area network, or to the Internet.

In operation, appliance 402 can communicate with devices, such as phone 406 (e.g., an IP phone), computers 408, 412, or a high definition video camera (not illustrated), coupled directly to local area network 404. Local area network 404 may, in turn, be coupled to network 410, which may include any of the network types described above. Additional devices 414-418 may suitably be coupled to network 410 to communicate with appliance 402. In accordance with various exemplary embodiments, appliance 402 communicates with appliance 416, either directly, or as shown, indirectly.

In accordance with various embodiments of the invention, system 400 additionally includes a short-range communication device 420 coupled to network 404 and/or network 410. Although illustrated as integral with device 402, short-range communication device 420 may be independently coupled to network 404 and/or 410 and/or be integral with one or more of devices 406, 408, 412-418.

As set forth in more detail below, during operation of system 400, device 420 can be used to facilitate dissemination of information to participants of a conference call regarding participants joining or leaving the conference call and allows for monitoring active participants in the conference by using short-range communication to identify participants as they join or leave the conference. The participant list information may be displayed on, for example, a screen of device 402, 406, 408, 412-418.

Figure 5:
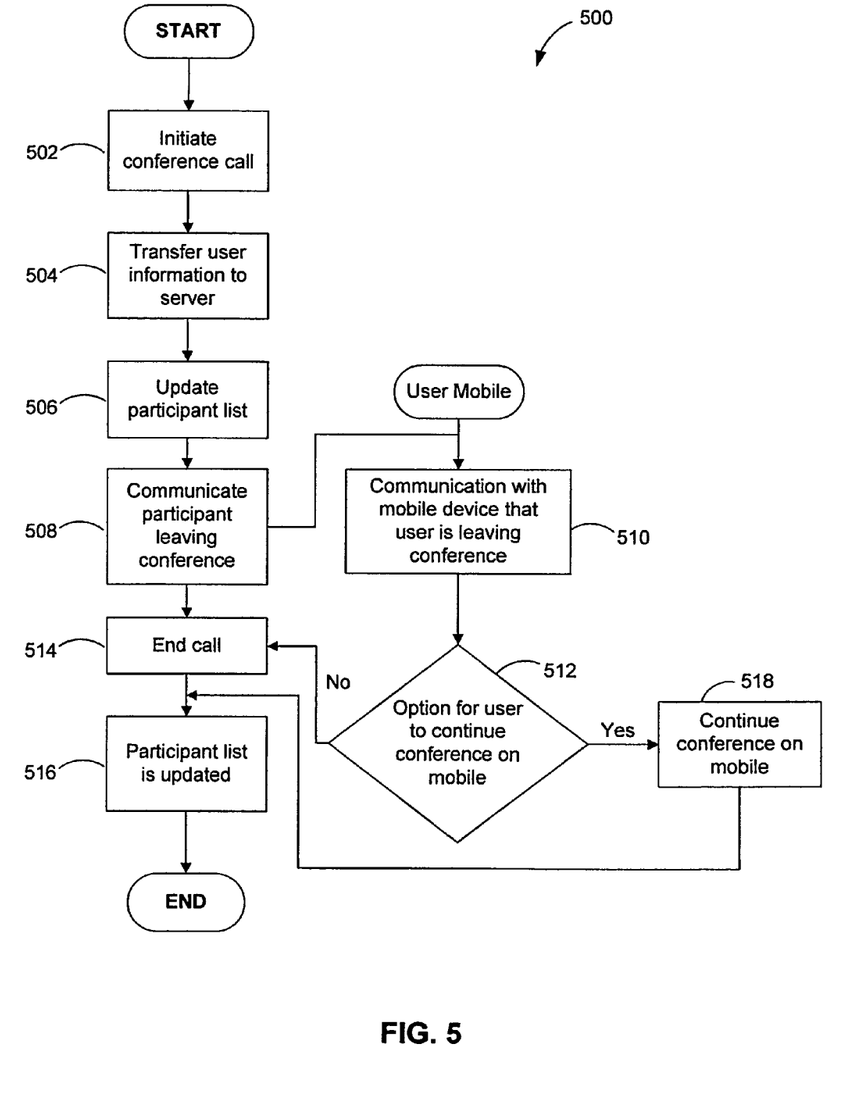
FIG. 5 illustrates a method for conference calling in accordance with yet further exemplary embodiments of the invention.

FIG. 5 illustrates a method 500 of using system 400 during a conference call. Method 500 includes the steps of initiating a conference call (step 502), transferring user information (step 504), updating a participant list (step 506), communicating a user leaving the conference (step 508), communicating with the mobile device (step 510), deciding whether to stay on the call (step 512), if a user decides to not stay on the call, ending the call (step 514) and updating participant list (step 516), or if user decides to remain on the conference call, continuing the conference call on the mobile device (step 518) and optionally updating the participant list (step 516). In accordance with additional aspects of these embodiments, the participant list is not updated if the user decides to stay on the call using a mobile device.

During step 502, a teleconference—e.g., an audio web conference—is initiated—e.g., using one of devices 402, 406, 408, 412-418. Participant list information for individual or multiple participants is established manually or automatically (e.g., using the short-range communication techniques described herein). Participant information may include, for example, the name, company, position, location, phone number, email, and/or the like for each participant.

In accordance with various exemplary embodiments of the invention, at least some participant information is entered automatically using short-range communication (step 504) and the conference call participant list (e.g., an AWC participant list) is updated (step 506) accordingly. Using short-range communication to update the participant list allows for real-time updates of the participant list, without any manual input from any of the users or from the administrator. By way of example, a client may place a mobile device enabled with short-range communication capabilities proximate short-range communication device 420, while running a client program, to send information via network 404, to update the participant list.

If a conference call participant decides to leave the conference call area, the participant (user) may bring a short-range communication enabled device (e.g., a mobile phone) proximate device 420 to transfer the conference call information to the mobile device and to inform the other conference participants that the participant is leaving the area (step 508). At this time, the user is prompted by the mobile client whether the client wishes to remain on the call or to end the call (step 512). If the participant leaves the area, but decides to stay on the call (step 518), the participant list may be updated to show that the participant is no longer at the previous location, but rather is on a mobile device (step 516). Alternatively, if the user decides to end participation in the conference call, the user call may end (step 514) and the participant list may be updated to show that the user has left the conference (step 516).

Transferring Calls

In accordance with additional embodiments of the invention, calls may be transferred from one device (e.g., a desk phone, a conference phone, a computer, or the like) to or from another device (e.g., a mobile phone), using information transferred with short-range communication.

Typically, users can push calls from a mobile device to the user's particular desk phone by entering dual tone multi-frequency (dtmf) or by using another application to instruct a PBX (Private Branch Exchange) to move the call from one device to the other. Such call transfers generally take place between a desk phone associated with a user and a mobile phone associated with that user, since the corresponding data is known to the system (e.g., a UCA/PBX).

In accordance with various embodiments of this disclosure, calls are transferred to or from different devices, which need not be associated with a particular user, using short-range communication, in a manner such that no information is required to be manually entered by the user to transfer the call. By way of example, a mobile device may be enabled with a short-range communication client as described above and a desk phone may include a short-range communication device. When a call is to be transferred, the user enables the mobile client application on a mobile device, the mobile device is placed proximate the desk phone, and the user is prompted (either on the mobile device or the other device, or both) as to whether the user would like the call transferred. If the user elects to transfer the call, the requisite mobile device and/or phone information is transferred to the second device, and the call is transferred between the desk phone and the mobile device—either from the mobile device to the desk phone or from the desk phone to the mobile device. For example, a PBX routed mobile call can be transferred to a desk phone or vice versa.

User Status Change

In accordance with yet additional embodiments of the disclosure, short-range communication techniques described herein can be used to change a status (e.g., a location on a UCC) of a caller and optionally automatically change the user's call routing (as described above) and/or instant messaging options. In this case, a user places a mobile short-range communication device (e.g., a mobile device) proximate a short-range communication enabled device (e.g., a standalone device, a desk phone, a computer, or the like) and the user is prompted whether the user would like to change the user status and/or whether the user is arriving or leaving a particular location. If the user is arriving at a location, the user may indicate "yes" to the status change inquiry and the user status is then changed to indicate the user is at a particular location and calls may be automatically routed and/or IM options may be automatically changed as a result of the user's indication to change status. Alternatively, if the user is leaving an area, the user may place the mobile short-range communication enabled device proximate the other short-range communication enabled device, and when prompted, indicate that the user is leaving the location and/or indicate the user is at another location. For example, when a user places a short-range communication enabled mobile device proximate a corresponding short-range communication device, one or both of the devices may prompt the user as to whether the user would like to change a location. If the user responds "yes," then the user may select from a list of locations or may manually enter another location. Alternatively, the information may be simplified and the mobile client application may inquire only as to whether the user is arriving or leaving the specific location (e.g., the office or home) or a status of a user—e.g., in a meeting, not in a meeting, or the like. In accordance with yet further exemplary embodiments of the invention, the status change indication may be completely automatic, such that the user's status is changed once the user places the first short-range communication enabled mobile device proximate a second, corresponding short-range communication device. And, optionally in each case, calls may be automatically routed and/or IM options may automatically change as a result of an indication that the user is changing a status.

Data Sharing

A client may provision information directly to another client using short-range communication techniques described herein. For example, once a user has configured specific data, such as a set of locations or local data that the user uses for automatic status changes, for example, as part of a UCC system, such information may be directly transferred to another user by running the client application described above and placing two devices equipped with short-range communication technology proximate each other. Alternatively, a client may provision a second client over a network by placing a first client device capable of short-range communication proximate a second device capable of short-range communication, transferring the information to be provisioned to the second device, transferring the information over a portion of a network, and communicating the information to the second client device.

Providing Temporary Access to Applications or Services on a Network

In accordance with additional embodiments of the invention, the short-range communication system (e.g., system 100) can be used to provide temporary authorization to the user to, e.g., network 106 or a portion thereof, by passing requisite login and/or other information from device 104 to mobile device 102. Such access may be provided on a temporary basis using temporary login information, by providing a time-out, or the like. Such access may be to, for example, provide administrator access to a technician troubleshooting the system.

Building Community Groups

In accordance with yet additional exemplary embodiments of the invention, the system and method of the disclosure is used to rapidly build community groups or participant lists. Referring momentarily to FIG. 1, system 100 can be used to build a community group or participant list by accessing user information on device 102 as device 102 is placed proximate device 104. For example, while running a client program, as a user places mobile device 102 proximate device 104, the user may be prompted as to whether the user would like to join a particular group or be added to a participant list—e.g., a group of people at a meeting or on a conference call or any other group. The user may respond "yes," in which case a corresponding participant list for that group is updated accordingly. Alternatively, a client may be automatically added to a group by placing a mobile device running a mobile client application as described herein, and placing the mobile device proximate a short-range communication device, such as device 104. Participants may similarly be deleted from groups using these techniques.

Pass of Control

In accordance with yet additional embodiments of the disclosure, the system and method can be used to pass control from, for example, person(s) or group(s) to another person(s) or group(s). By way of example, a manager on duty can use system 100 to "log in" for a shift and another manager can "log out" by running the client program on device 102 and passing device 102 proximate device 104. The client program may ask for verification of the user's intent to log in or out of a particular shift.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

We claim:

1. A method of communication on a conference call the method comprising the steps of:
    establishing a conference call between at least one telephony device and a collaboration appliance, the collaboration device coupled to a short-range communication component;
    placing a mobile device having short-range communication capabilities proximate the short-range communication component;
    establishing a participant list comprising participant information regarding participants on the conference call, wherein at least participant information for a user of the mobile device is established on the list automatically using short-range communication;
    disseminating the participant list via the collaboration appliance to participants on the conference call;
    updating the participant list as participants join or leave the conference call;
    transferring the call from the collaboration appliance to the mobile device; and optionally updating the participant list to inform the other participants of the transfer to the mobile device.

2. The method of claim 1, further comprising the step of updating the user participant list using information transmitted using short-range communication.

3. The method of claim 1, further comprising the step of installing a client program on the mobile device.

4. The method of claim 1, wherein the collaboration appliance comprises one of a telephone or a computer.

5. The method of claim 1, wherein the short-range communication is a distance of about two feet or less.

6. The method of claim 1, wherein the short-range communication is a distance of about 4 cm or less.

7. The method of claim 1, further comprising the step of transferring a call between the mobile device and another device.

8. The method of claim 1 further comprising displaying a prompt on the mobile device to remain on the conference call or to end the call.

* * * * *